United States Patent
Desmoulins et al.

(10) Patent No.: US 6,676,117 B2
(45) Date of Patent: Jan. 13, 2004

(54) HYDRAULIC VIBRATION-DAMPING SUPPORT INCLUDING A CLIP-ON DECOUPLING FLAP

(75) Inventors: Mickaël Desmoulins, Patay (FR); Jean-Pierre Monneau, Douy (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 10/274,618

(22) Filed: Oct. 21, 2002

(65) Prior Publication Data
US 2003/0080482 A1 May 1, 2003

(30) Foreign Application Priority Data
Oct. 29, 2001 (FR) ............................... 01 13967

(51) Int. Cl.$^7$ ............................................. F16F 13/00
(52) U.S. Cl. ............................ 267/140.13; 267/141.6; 267/141.1; 267/219
(58) Field of Search ................. 267/219, 195, 267/292, 140.11, 140.12, 140.13, 140.3, 140.4, 141, 141.3, 141.6, 141.7, 141.1

(56) References Cited

U.S. PATENT DOCUMENTS

| | | | | |
|---|---|---|---|---|
| 4,664,363 A | * | 5/1987 | Gold et al. ............ | 267/140.13 |
| 4,765,601 A | | 8/1988 | Miller et al. ............ | 267/140.1 |
| 4,783,063 A | * | 11/1988 | Probst et al. ........... | 267/140.13 |
| 4,932,636 A | * | 6/1990 | Phillips et al. ......... | 267/140.13 |
| 4,986,510 A | | 1/1991 | Bellamy et al. ............ | 248/562 |
| 5,029,824 A | * | 7/1991 | LaBeau et al. ........ | 267/140.13 |
| 5,209,460 A | | 5/1993 | Bouhours et al. ...... | 267/140.14 |
| 5,263,693 A | * | 11/1993 | Klein .................... | 267/140.13 |
| 5,501,433 A | * | 3/1996 | Satori .................... | 267/140.13 |
| 5,571,263 A | * | 11/1996 | Koester et al. ........ | 267/140.13 |
| 5,833,219 A | | 11/1998 | Mellon .................. | 267/140.13 |
| 5,947,226 A | * | 9/1999 | Bellamy et al. ............ | 180/299 |
| 6,267,362 B1 | * | 7/2001 | Satori et al. ........... | 267/140.13 |
| 6,425,575 B1 | * | 7/2002 | Takashima et al. .... | 267/140.13 |
| 6,505,822 B1 | * | 1/2003 | Yamamoto et al. .... | 267/140.13 |
| 6,554,263 B2 | * | 4/2003 | Takashima et al. .... | 267/140.13 |
| 2003/0030202 A1 | * | 2/2003 | Thomazeau et al. ... | 267/140.13 |

FOREIGN PATENT DOCUMENTS

| | | |
|---|---|---|
| EP | 0346227 | 12/1989 |
| EP | 0461024 | 12/1991 |
| FR | 2751042 | 1/1998 |
| JP | 2000266108 | * 9/2000 |

OTHER PUBLICATIONS

International Preliminary Search report dated Jul. 8, 2002, Appl. No. FR 0113.

* cited by examiner

Primary Examiner—Christopher P. Schwartz
Assistant Examiner—Devon Kramer
(74) Attorney, Agent, or Firm—McCracken & Frank

(57) ABSTRACT

A hydraulic vibration-damping support comprising two strength members interconnected by an elastomer body which defines a working chamber communicating with a compensation chamber via a constricted passage. The two hydraulic chambers are separated from each other by a rigid partition formed by two gratings disposed one on the other, and a decoupling flap is mounted with a small amount of clearance between the gratings. The decoupling flap is provided with two catches that are clipped onto one of the gratings.

9 Claims, 2 Drawing Sheets

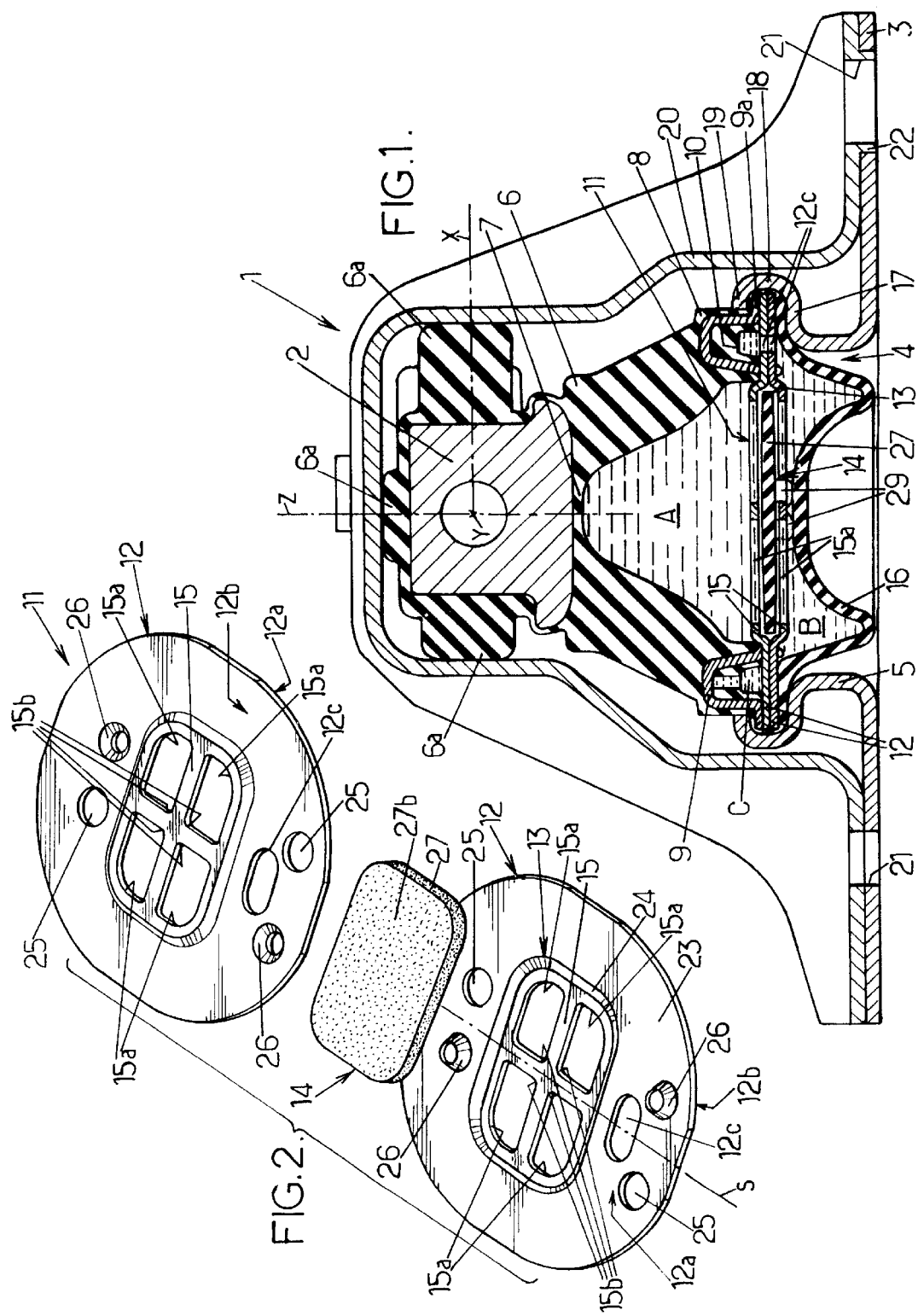

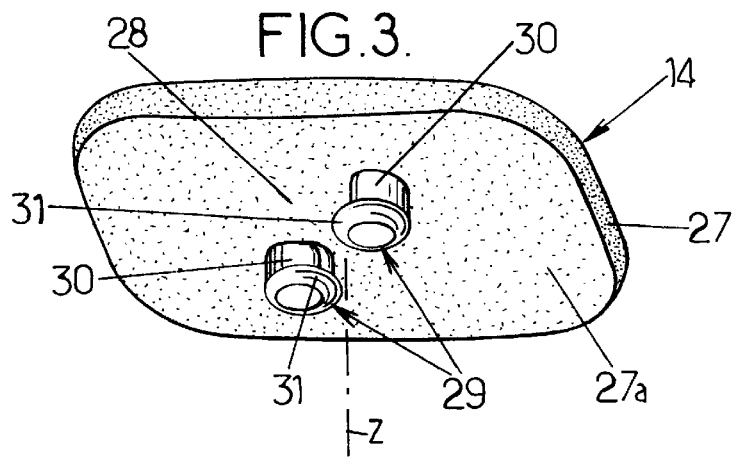
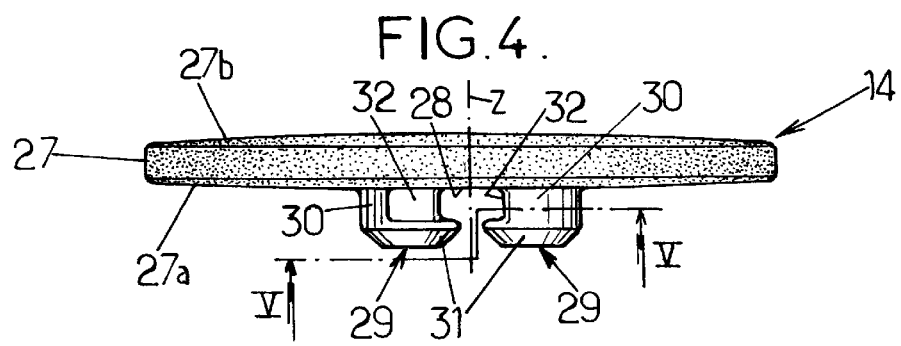
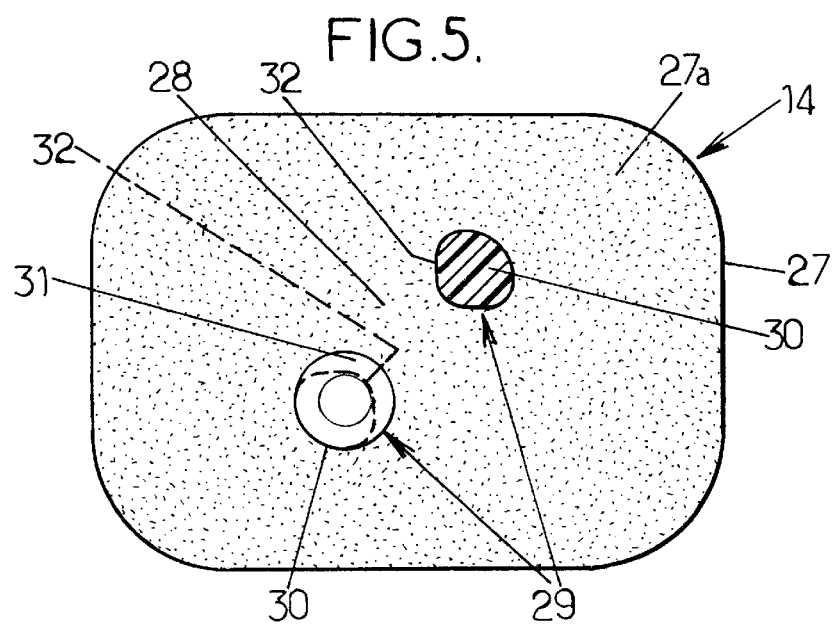

HYDRAULIC VIBRATION-DAMPING SUPPORT INCLUDING A CLIP-ON DECOUPLING FLAP

FIELD OF THE INVENTION

The present invention relates to hydraulic vibration-damping supports including clip-on decoupling flaps and serving, for example, for mounting the engine-and-gearbox unit of a vehicle on the body of the vehicle.

More particularly, the invention relates to a hydraulic vibration-damping support designed to be interposed between two rigid elements (e.g. an engine-and-gearbox unit of a vehicle and the body of said vehicle) for damping and interconnection purposes, said support comprising:

two rigid strength members designed to be connected to respective ones of the two rigid elements to be interconnected;

an elastomer body connecting together the two strength members;

a working chamber filled with liquid and defined in part by the elastomer body;

a flexible elastomer wall which is secured to the second strength member;

a compensation chamber filled with liquid and defined in part by the flexible elastomer wall;

a constricted passage filled with liquid and which puts the working chamber into communication with the compensation chamber;

a rigid partition separating the working chamber from the compensation chamber, said rigid partition being provided with at least first and second gratings, each of which has a plurality of liquid-passing holes, the gratings defining between them a housing, the liquid-passing holes of one of the first and second gratings putting said housing into communication with the working chamber, and the liquid-passing holes of the other of the first and second gratings putting said housing into communication with the compensation chamber; and a decoupling flap made of elastomer and comprising a pad which has first and second faces facing respective ones of the first and second gratings, said pad being mounted with a small amount of clearance (at least over a portion of its surface area) between said gratings, and said decoupling flap further comprising a first elastomer fastening member which projects from the first face of the pad, said first fastening member being fixed to the first grating by being clipped thereto, with clearance sufficient to enable said pad to move between the two gratings.

BACKGROUND OF THE INVENTION

Document FR-A-2 751 042 describes an example of such a vibration-damping support which is quite satisfactory as regards technical operation.

In vibration-damping supports of the type described in that document, the decoupling flap is clipped to the first grating only, by means of said first fastening member, engaged resiliently in a hole in said first grating that is provided specifically for that purpose, and that does not allow liquid to pass through it.

The first fastening member can turn inside the hole in question, so that that assembly configuration does not set the angular position of the decoupling flap about its central axis.

In practice, that freedom of movement thus makes it necessary to give the decoupling flap a shape that is symmetrical about an axis, which is not always the best solution.

OBJECTS AND SUMMARY OF THE INVENTION

A particular object of the present invention is to mitigate that drawback.

To this end, in a vibration-damping support of the type in question the decoupling flap further comprises a second fastening member which projects from the first face of the pad, said first and second fastening members being clipped into respective ones of two liquid-passing holes in the first grating, while leaving said liquid-passing holes unobstructed in part.

By means of these provisions, the decoupling flap is positioned properly relative to the gratings of the rigid partition, which makes it possible to give the flap and the gratings any outline, and in particular an outline that is not symmetrical about an axis.

The decoupling flap can thus be clipped to the first grating before the vibration-damping support is fully assembled, thereby simplifying the assembly process, because no concern needs to be given to the positioning of the decoupling flap during said assembly process. This is even more important since the assembly process in question is usually performed in a bath of liquid to guarantee that the hydraulic vibration-damping support is filled properly with said liquid, so that said assembly process is relatively difficult to implement.

Finally, it should be noted that the two fastening members of the decoupling flap are clipped into two liquid-passing holes, so that it is no longer necessary to provide dedicated clipping holes for the sole purpose of clipping the decoupling flap. The gratings of the rigid partition are thus simpler to manufacture.

In preferred embodiments of the invention, it is optionally possible, in addition, to use any of the following provisions:

the first and second fastening members are fixed to the first grating with clearance that is sufficient to enable the pad to move between the two gratings;

the decoupling flap has a shape that is not circularly symmetrical about a central axis that is perpendicular to the pad of said decoupling flap;

the fastening members co-operate with the first grating to hold the decoupling flap stationary without clearance parallel to the pad;

each of the first and second fastening members comprises firstly a body that passes through the corresponding liquid-passing hole and that is in abutment against an uninterrupted portion of the first grating that defines said liquid-passing hole, and secondly a head which overlaps in part said uninterrupted portion of the first grating;

the heads of the first and second fastening members project towards each other from the bodies of said first and second fastening members;

the liquid-passing holes of the first grating are distributed angularly about a central axis, and each of them has a wedge-shaped portion in the vicinity of said central axis, the bodies of the first and second fastening members being in abutment against said uninterrupted portion of the first grating at the wedge-shaped portions of the corresponding liquid-passing holes;

the bodies of the first and second fastening members have portions adapted to fit closely to said wedge-shaped portions of the corresponding liquid-passing holes; and the pad has a central portion from which the fastening members extend, the first and second faces of the pad having convex shapes, and the pad having its maximum thickness at said central portion.

BRIEF DESCRIPTION OF THE DRAWINGS

Other characteristics and advantages of the invention appear from the following description of one of its embodiments given by way of non-limiting example and with reference to the accompanying drawings.

In the drawings:

FIG. 1 is a vertical section view through a vibration-damping support in an embodiment of the invention;

FIG. 2 is an exploded perspective view of the rigid partition between the two hydraulic chambers of the vibration-damping support of FIG. 1;

FIG. 3 is a perspective view of the decoupling flap of the vibration-damping support of FIG. 1;

FIG. 4 is a side view of the decoupling flap of FIG. 3; and

FIG. 5 is a fragmentary section view of the flap of FIG. 4, on the line 5—5 of FIG. 4.

MORE DETAILED DESCRIPTION

In the various figures, like references designate identical or similar elements.

It should be noted that, in the following description, the terms "top", "bottom", "upwards", and "downwards" are given merely to make it easier for the reader to understand, with reference to the example shown in the drawings, but that they are in no way limiting.

FIG. 1 shows a vibration-damping support 1 which comprises:

a first rigid metal strength member 2 which, in the example shown, extends longitudinally along a horizontal axis Y, and which is designed to be fixed to the engine-and-gearbox unit of a vehicle, for example;

a second rigid metal strength member 3 which is designed to be fixed to the body of the vehicle, for example; in the example in question, the second strength member is in the form of a horizontal plate of sheet metal provided with a central opening 4 having an annular rim 5 that extends upwards;

an elastomer body 6 which is bell-shaped and which extends about a vertical axis Z between a top 7 that is molded over and bonded to the first strength member 2, and an annular base 8 that is secured to the second strength member 3, the elastomer body 6 being strong enough to take up the compression forces due to the weight of the engine-and-gearbox unit.

Advantageously, the annular base 8 of the elastomer body is reinforced by a sheet metal ring 9 that is embedded in said base and that is preferably of channel-section and open parallel to the vertical axis Z facing the second strength member 3, i.e. downwards in the example shown. The ring 9 thus defines an internal volume which is partially filled with a mass of elastomer defining a circular arcuate groove 10 that is open parallel to the vertical axis Z facing the second strength member 3.

In addition, the vibration-damping support 1 further comprises a rigid partition 11 which extends perpendicularly to the axis Z and which bears against the annular base 8 of the elastomer body in leaktight manner to define therewith a working chamber A filled with liquid.

The partition 11 is made up of two identical cut-out and stamped pieces of sheet metal 12 which are disposed one on the other and which define between them a flap housing 13 for receiving a decoupling flap 14 made of elastomer and comprising an elastomer pad 27 and two fastening members 29 integrally molded with said pad.

The pad 27 is mounted in the housing 13 with a small amount of clearance parallel to the axis Z, e.g. clearance of about 0.5 millimeters (mm). In addition, each of the two pieces of sheet metal 12 is provided with a grating 15, one of which puts the flap housing 13 into communication with the above-mentioned working chamber A via liquid-passing holes 15a, the other grating putting said flap housing 13 into communication with a compensation chamber B filled with liquid, also via liquid-passing holes 15a.

The fastening members 29 are clipped into respective ones of two liquid-passing holes 15a in one of the gratings 15, while leaving said holes unobstructed in part. In addition, the two fastening members 29 are clipped into the corresponding holes 15a with clearance sufficient to enable the elastomer pad 27 to come into abutment against both of the gratings 15 in alternation, thereby alternately closing off the holes 15a in the gratings, when the two strength members of the vibration-damping support are subjected to vibration.

The two fastening members 29 are also clipped in a manner such as to hold the decoupling flap stationary parallel to the pad 27, preferably without any clearance parallel to said pad, thereby making it possible to position said decoupling flap angularly relative to the corresponding grating 15 when the vibration-damping support is assembled. This configuration is particularly useful when the decoupling flap 14 and the gratings 15 are of shapes that are not circularly symmetrical about the central axis Z.

The compensation chamber B is separated from the working chamber A by the partition 11 and it is defined between said partition 11 and a flexible elastomer wall 16 that is bellows-shaped, for example.

Advantageously, the annular base 8 of the elastomer body, the partition 11, and the peripheral margin of the flexible elastomer wall 16 are assembled together by crimping the second strength member 3. In particular, as shown in FIG. 1, the annular rim 5 of the second strength member 3 may be extended radially outwards by a shoulder 17 against which the periphery of the flexible elastomer wall bears, said shoulder 17 being extended parallel to the axis Z towards the first strength member 2 by an annular rim 18 itself extended radially inwards by a crimped annular margin 19 that comes into abutment against a peripheral radial margin 9a of the ring 9.

Thus, said ring 9 and the base 8 of the elastomer body are pressed firmly against the periphery of the top piece of sheet metal 12, itself pressed against the periphery of the bottom piece of sheet metal 12 which clamps the periphery of the flexible wall 16 against the shoulder 17.

The hydraulic chambers A and B communicate with each other via a constricted passage C filled with liquid and that is defined between the above-mentioned groove 10 and the top piece of sheet metal 12.

The constricted passage C communicates with the working chamber A via an opening (not shown) provided to open radially inwards in the base 8 of the elastomer body, through a local gap in the ring 9, at one of the ends of the circular arcuate groove 10. In addition, the constricted passage C communicates with the compensation chamber B at the other end of the groove 10, via two through holes 12c provided in the peripheral portions of the two pieces of sheet metal 12, the two through holes 12c being disposed in register with each other and in register with the constricted passage C.

As in the example shown, the vibration-damping support 1 may optionally further comprise a limiting cap 20 made of stamped sheet metal and that surrounds the elastomer body 6 and the first strength member 2. The limiting cap 20 is fixed to the second strength member 3, and those two parts are advantageously provided with holes 21 that are mutually in register to enable the second strength member 3 and the cap 20 to be fixed to the body of the vehicle.

Optionally, the limiting cap 20 may be fixed to the second strength member 3 by crimping 22 at all or some of the holes 21. The limiting cap 20 is adapted to cooperate by coming into abutment with projections 6a on the elastomer body, which projections are disposed around the first strength member 2, to limit the movement of said first strength member parallel to the axis Z remote from the second strength member 3, and parallel to a horizontal axis X perpendicular to the axes Y and Z, in both directions.

As shown in more detail in FIG. 2, each of the two pieces of sheet metal 12 of the rigid partition is provided with an inside first face 12a facing towards the other piece of sheet metal 12, and an outside second face 12b, the outside face of the top piece of sheet metal 12 facing towards the working chamber A, and the outside face of the bottom piece of sheet metal 12 facing towards the compensation chamber B.

The inside first face 12a of each piece of sheet metal forms a peripheral annular abutment surface 23 in the middle of which a central dish 24 is formed, the bottom of which is cut out to form the holes 15a of the grating 15 of the piece of sheet metal in question. At least the annular abutment surface 23 of each piece of sheet metal 12 is symmetrical about an axis of symmetry S parallel to said abutment face (in the example shown, each abutment face 23 is plane and the axis S is contained in the plane of said abutment face). Thus, when the two pieces of sheet metal 12 are disposed with their first faces 12a facing each other, their abutment surfaces 23 are exactly in register with each other and are entirely in contact with each other. In addition, the dishes 24 formed by the two pieces of sheet metal 12 and defined externally by the abutment surfaces 23 are then also exactly in register with each other, while defining between them the flap housing 13.

Similarly, the through hole 12c in each piece of sheet metal 12 is symmetrical about the axis S, so that when the two pieces of sheet metal 12 are disposed with their first faces 12a facing each other, the two through holes 12c are exactly in register with each other.

To make it easier to position the two pieces of sheet metal 12 relative to each other when assembling the vibration-damping support, each piece of sheet metal 12 is advantageously provided with at least one recess 25 provided in its abutment surface 23, said recess 25 being symmetrical about the axis S with a stamped lug 26 that projects relative to said abutment surface 23.

The recess 25 and the corresponding lug 26 have complementary shapes so that, when the two pieces of sheet metal 12 are disposed with their first faces 12a facing each other, the lug 26 on each of the pieces of sheet metal engages into the recess 25 in the other piece of sheet metal.

Naturally, each piece of sheet metal 12 may be provided with a plurality of lugs 26 and with a plurality of recesses 25 symmetrical to the lugs 26 about the axis S: in the example shown, each piece of sheet metal 12 is provided with two lugs 26 and with two recesses 25.

The recesses 25 and the lugs 26 do not give rise to any leakage between the chambers A, B, insofar as they are covered over in leaktight manner by the base 8 of the elastomer body and by the periphery of the flexible wall 16 when the vibration-damping support 1 is assembled.

As can be seen in FIG. 2, the dishes 24 in the two pieces of sheet metal 12 have shapes that, in the example in question, are not circularly symmetrical about the central axis Z of the vibration-damping support, and the pad 27 has a corresponding shape. In the example shown, the dishes 24 and the pad 27 are substantially rectangular in shape with rounded corners.

In addition, the holes 15a in both of the gratings 15, or at least the holes 15a in the grating 15 in which the fastening members 29 are clipped, are advantageously distributed angularly about the central axis Z, and each of them has a wedged-shaped portion in the vicinity of said central axis Z.

As shown in FIGS. 3 to 5, the fastening members 29 on the decoupling flap may, for example, be in the form of two pins that extend parallel to the axis Z from a central portion 28 of the pad 27, on one of the faces (27a) of said pad.

Each of the pins has a body 30 which extends from the face 27a of the elastomer pad to a free end forming an enlarged head 31 of circular section.

The bodies 30 of the two fastening members 29 have non-circular cross-sections, with wedge-shaped portions 32 that are angularly positioned to face each other, and that are adapted to come into abutment against the wedge-shaped portions 15b of two through holes 15a which are diametrically opposite each other about the axis Z, so as to fit closely against said portions 15b.

The enlarged heads 31 project towards each other parallel to the pad 27 from the above-mentioned wedge-shaped portions so as to overlap the uninterrupted portion situated at the center of the grating 15.

Preferably, as can be seen clearly in FIG. 4, the two faces 27a, 27b of the pad 27 may be convex, e.g. in the form of spherical domes of large radius (e.g. of radius in the range 30 centimeters (cm) to 50 cm). This configuration makes it possible to avoid banging noises when the pad 27 strikes against the two gratings 15 in alternation in operation. It should be noted that, the central portion 28 of the pad may optionally be continuously in abutment against the central portions of the two gratings 15, the above-mentioned clearance between the decoupling flap 14 and said gratings 15 then being present only at the peripheral portions of the pad 27.

The above-described vibration-damping support operates as follows: when the two strength members 2, 3 undergo relative vibratory movements, such vibratory movements cause liquid to be transferred between the working chamber A and the compensation chamber B:

when the vibratory movements are of relatively low frequency (e.g. lower than 20 hertz (Hz)) and of relatively large amplitude (e.g. larger than 1 mm), they cause liquid to be transferred between the chambers A and B via the constricted passage C, which generates damping of the vibratory movements; and when the vibratory movements are of high frequency (e.g. higher than 20 Hz) and of small amplitude (e.g. smaller than 1 mm), the vibratory movements are filtered out by the decoupling flap 14 which oscillates freely between the two gratings (the transfer of liquid between the two chambers A and B is then essentially due to the movements of the flap 14).

What is claimed is:

1. A hydraulic vibration-damping support designed to be interposed between two rigid elements for damping and interconnection purposes, said support comprising:

two rigid strength members designed to be connected to respective ones of the two rigid elements to be interconnected;

an elastomer body connecting together the two strength members;

a working chamber filled with liquid and defined in part by the elastomer body;

a flexible elastomer wall which is secured to the second strength member;

a compensation chamber filled with liquid and defined in part by the flexible elastomer wall;

a constricted passage filled with liquid and which puts the working chamber into communication with the compensation chamber;

a rigid partition separating the working chamber from the compensation chamber, said rigid partition being provided with at least first and second gratings, each of which has a plurality of liquid-passing holes, the gratings defining between them a housing, the liquid-passing holes of one of the first and second gratings putting said housing into communication with the working chamber, and the liquid-passing holes of the other of the first and second gratings putting said housing into communication with the compensation chamber; and a decoupling flap made of elastomer and comprising a pad which has first and second faces facing respective ones of the first and second gratings, said pad being mounted with a small amount of clearance between said gratings, and said decoupling flap further comprising a first elastomer fastening member which projects from the first face of the pad, said first fastening member being fixed by clipping to the first grating;

said vibration-damping support being wherein the decoupling flap further comprises a second fastening member which projects from the first face of the pad, said first and second fastening members being clipped into respective ones of two liquid-passing holes in the first grating, while leaving said liquid-passing holes unobstructed in part.

2. A vibration-damping support according to claim 1, in which the first and second fastening members are fixed to the first grating with clearance that is sufficient to enable the pad to move between the two gratings.

3. A vibration-damping support according to claim 1, in which the decoupling flap has a shape that is not circularly symmetrical about a central axis that is perpendicular to the pad of said decoupling flap.

4. A vibration-damping support according to claim 1, in which the fastening members co-operate with the first grating to hold the decoupling flap stationary without clearance parallel to the pad.

5. A vibration-damping support according to claim 1, in which each of the first and second fastening members comprises firstly a body that passes through the corresponding liquid-passing hole and that is in abutment against an uninterrupted portion of the first grating that defines said liquid-passing hole, and secondly a head which overlaps in part said uninterrupted portion of the first grating.

6. A vibration-damping support according to claim 5, in which the heads of the first and second fastening members project towards each other from the bodies of said first and second fastening members.

7. A vibration-damping support according to claim 5, in which the liquid-passing holes of the first grating are distributed angularly about a central axis, and each of them has a wedge-shaped portion in the vicinity of said central axis, the bodies of the first and second fastening members being in abutment against said uninterrupted portion of the first grating at the wedge-shaped portions of the corresponding liquid-passing holes.

8. A vibration-damping support according to claim 7, in which the bodies of the first and second fastening members have portions adapted to fit closely to said wedge-shaped portions of the corresponding liquid-passing holes.

9. A vibration-damping support according to claim 1, in which the pad has a central portion from which the fastening members extend, the first and second faces of the pad having convex shapes, and the pad having its maximum thickness at said central portion.

* * * * *